US008281091B2

(12) United States Patent
Braginsky et al.

(10) Patent No.: US 8,281,091 B2
(45) Date of Patent: Oct. 2, 2012

(54) AUTOMATIC SELECTION OF STORAGE VOLUMES IN A DATA STORAGE SYSTEM

(75) Inventors: Anastasia Braginsky, Haifa (IL); Shachar Fienblit, Ein Ayala (IL)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 12/396,572

(22) Filed: Mar. 3, 2009

(65) Prior Publication Data

US 2010/0228933 A1   Sep. 9, 2010

(51) Int. Cl.
*G06F 12/16* (2006.01)
(52) U.S. Cl. .................... 711/162; 711/E12.103
(58) Field of Classification Search .............. None
See application file for complete search history.

(56) References Cited

U.S. PATENT DOCUMENTS

| 7,146,474 | B2 | 12/2006 | Nguyen et al. | |
|---|---|---|---|---|
| 7,269,701 | B2 | 9/2007 | Shackelford et al. | |
| 7,676,510 | B1 * | 3/2010 | Karinta | 707/654 |
| 2004/0181641 | A1 * | 9/2004 | Nguyen et al. | 711/162 |
| 2004/0268069 | A1 * | 12/2004 | Satoyama et al. | 711/162 |
| 2005/0033929 | A1 * | 2/2005 | Burton et al. | 711/162 |
| 2005/0154852 | A1 * | 7/2005 | Nakagawa et al. | 711/170 |
| 2005/0262168 | A1 * | 11/2005 | Helliker et al. | 707/204 |
| 2006/0031649 | A1 * | 2/2006 | Murotani et al. | 711/162 |
| 2007/0192552 | A1 | 8/2007 | Dutta et al. | |
| 2008/0082777 | A1 * | 4/2008 | Sakaguchi et al. | 711/170 |
| 2008/0147878 | A1 | 6/2008 | Kottomtharayil et al. | |
| 2010/0011368 | A1 * | 1/2010 | Arakawa et al. | 718/104 |

OTHER PUBLICATIONS

Symantec. "Veritas NetBackup Administrators Guide, vol. 1 for UNIX and Linux." 2007. Symantec. pp. 723-740.*
Guillermo A. Alvarez et al. "Minerva: An Automated Resource Provisioning Tool for Large-Scale Storage Systems." Nov. 2001. ACM. ACM Transactions on Computer Systems. vol. 19. No. 4. pp. 483-518.*
Asit Dan et al. "A dynamic policy of segment replication for load-balancing in video-on-demand servers." 1995. Singer-Verlag. Multimedia Systems. vol. 3. pp. 93-103.*
Alex Davies et al. "Upgrading from BasicDisk to AdvancedDisk in NetBackup 6.5.x." Mar. 11, 2008. Symantec.*

* cited by examiner

*Primary Examiner* — Kevin Ellis
*Assistant Examiner* — Nathan N Sadler
(74) *Attorney, Agent, or Firm* — Century IP Group, Inc.; F. Jason Far-hadian, Esq.

(57) ABSTRACT

A method of selecting a target volume in a storage system is provided. The method comprises defining one or more parameters for a plurality of storage volumes in the storage system according to user preference; dynamically collecting information related to the parameters while the storage volumes are used; receiving a request to backup a first source volume in the storage system; and selecting or creating the target volume based on the collected information.

20 Claims, 5 Drawing Sheets

AUTOMATIC SELECTION OF STORAGE VOLUMES IN A DATA STORAGE SYSTEM

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to data storage systems and, more particularly, to automatic selection of target volumes in a data storage system.

BACKGROUND

Various technologies (e.g., snapshot technology) may be used to backup data in a data storage system. Generally, in response to a request to backup a source volume in the data storage system, a storage controller selects another volume in the data storage system and configures the selected volume to store a backup of the source volume. The selected volume is referred to as a target volume.

In one existing implementation, a target volume is selected, for example, based on future use patterns predicted by models or statistics (i.e., static information). In other words, the same information is used to select a target volume each time a backup request is received, regardless of user preference or changes in the data storage system.

In another existing implementation, a target volume is selected, for example, from a set of same or similar capacity storage volumes. Typically, the target volume is selected from among these pre-configured volumes based on how closely the size of the backup data matches the amount of space available on a pre-configured volume. Unfortunately, once the target volume is selected, the selection or the size of the target volume cannot be dynamically configured later to better suit the backup request or the current state of the data storage system.

Additionally, because the target volume is selected based on the size of the backup data and amount of space available on a pre-configured volume, the resulting configuration may be inefficient with respect to workload performance, power consumption, and other considerations.

Systems and methods are needed to overcome the above-mentioned shortcomings.

SUMMARY

The present disclosure is directed to systems and corresponding methods that facilitate automatic selection of target volumes in a data storage system.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method of selecting a target volume in a storage system is provided. The method comprises defining one or more parameters for a plurality of storage volumes in the storage system according to user preference; dynamically collecting information related to the parameters while the storage volumes are used; receiving a request to backup a first source volume in the storage system; and selecting or creating the target volume based on the collected information.

In accordance with another embodiment, a system comprising one or more logic units is provided. The one or more logic units are configured to perform the functions and operations associated with the above-disclosed methods. In accordance with yet another embodiment, a computer program product comprising a computer usable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
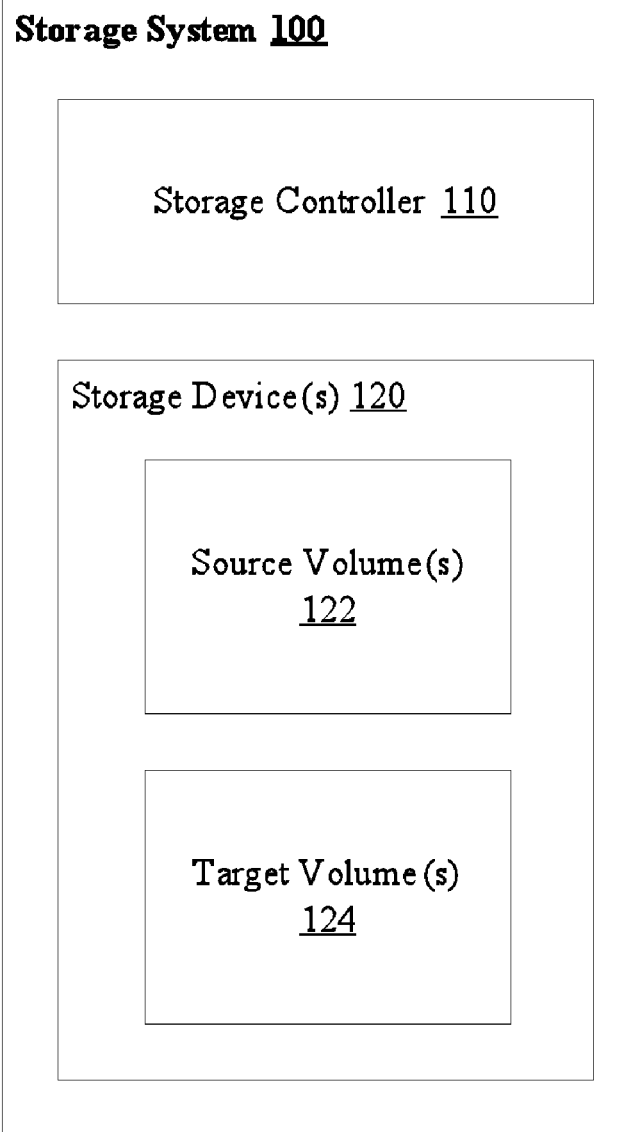
FIG. 1 illustrates an exemplary data storage system, in accordance with one or more embodiments.

Referring to FIG. 1, in accordance with one embodiment, an exemplary storage system 100 comprises a storage controller 110 and one or more storage devices 120. The storage devices 120 comprise one or more source volumes 122 for storing data and one or more target volumes 124 for storing backups of the source volumes 122.

Depending on configuration, the source volumes 122 and the target volumes 124 may comprise regular volumes, space efficient (SE) volumes, or a combination thereof. In a regular or fully provisioned volume, space is physically allocated on a one or more of the storage devices 120 when requested. In an SE or thin provisioned volume, space is virtually allocated on a repository volume when requested, and then physically allocated on one or more of the storage devices 120 when actually used.

Figure 2:
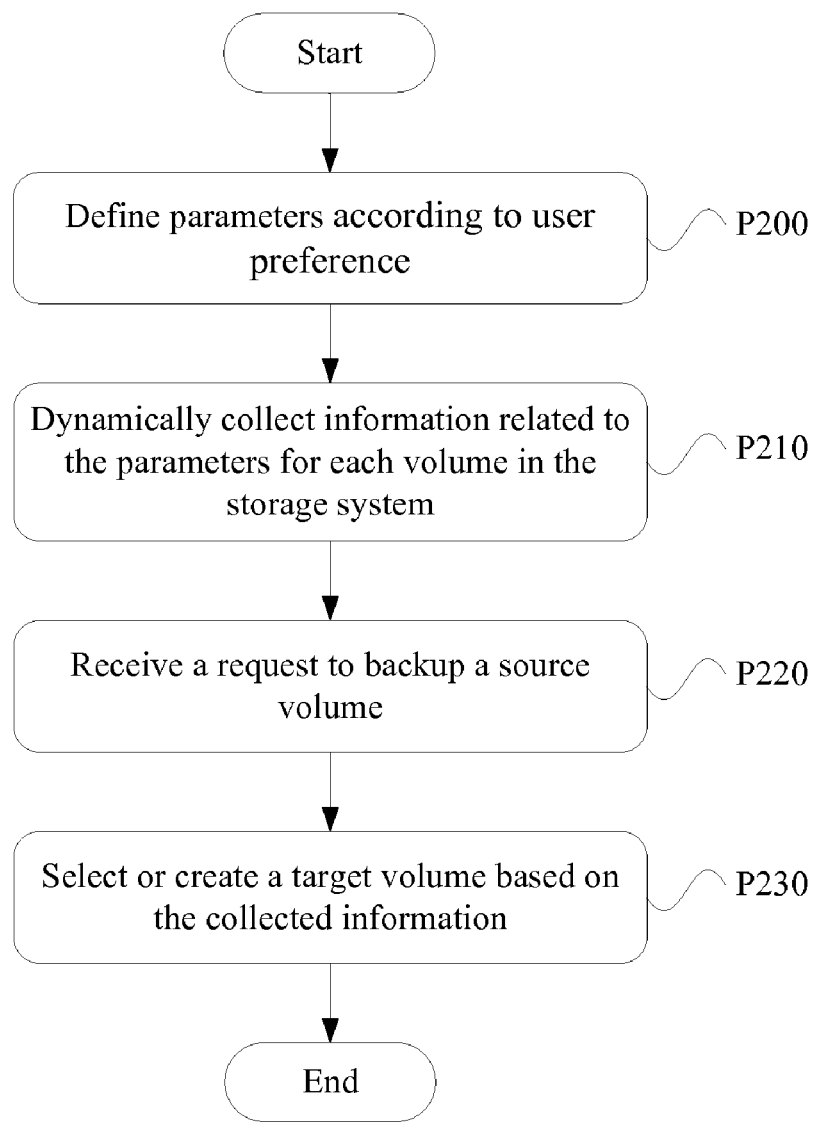
FIG. 2 is a flow diagram of a method for selecting a target volume, in accordance with one embodiment.

Referring to FIGS. 1 and 2, in accordance with one embodiment, the storage controller 110 defines one or more parameters according to user preference (P200). The parameters may be defined, for example, to optimize workload performance, storage space, use case, power consumption, etc. In an alternative embodiment, the parameters may be defined according to default settings.

Once the parameters are defined, the storage controller 110 dynamically collects and saves internal system information related to the parameters for each volume in the storage system 100 (P210). If, for example, the parameters are defined to optimize workload performance, the storage controller 110 may collect information on the input/output (I/O) rate and the read-to-write ratio for each volume in the storage system 100.

As another example, if the parameters are defined to optimize space usage, the storage controller 110 may collect information on the space currently allocated, capacity, allocation rate, maximum space usage, and recent use patterns of the storage system 100. Upon receiving a request to backup a source volume 122 (P220), the storage controller 110 selects or creates a target volume 124 based on the collected information (P230).

Figure 3:
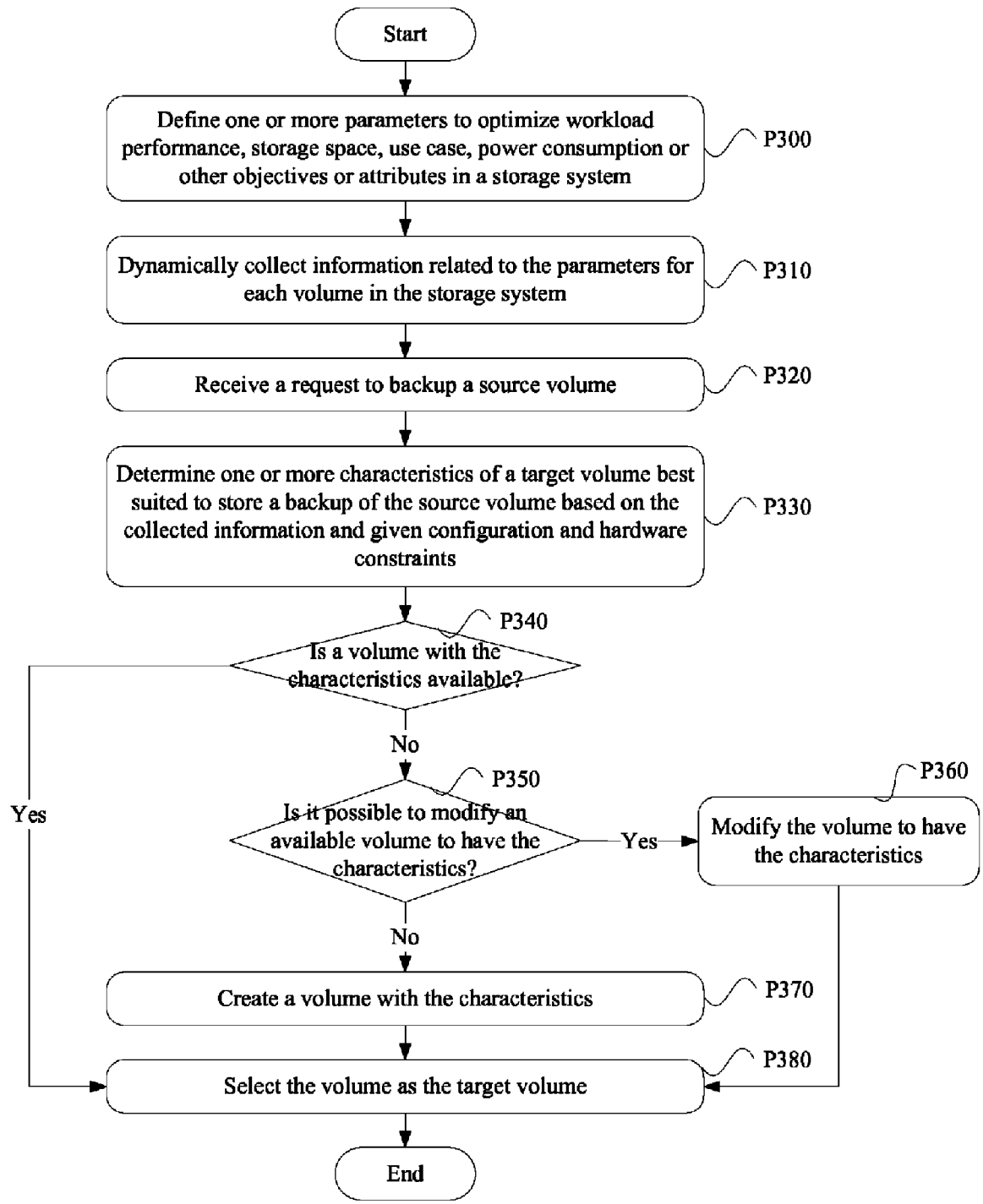
FIG. 3 is a flow diagram of a method for selecting a target volume, in accordance with one embodiment.

Referring to FIGS. 1 and 3, in accordance with one embodiment, the storage controller 110 defines one or more parameters to optimize workload performance, storage space, use case, power consumption, or other objectives or system attributes relevant to the storage system 100 (P300). Once the parameters are defined, the storage controller 110 dynamically collects and saves internal system information related to the parameters for each volume in the storage system 100 (P310).

Upon receiving a request to backup a source volume 122 (P320), the storage controller 110 determines one or more characteristics of a target volume 124 that is best suited to store a backup of the source volume 122 based on the collected information and given configuration and hardware constraints (P330).

If the parameters are defined to optimize workload performance and the read-to-write ratio is high, for example, the target volume 124 may be determined to be an SE volume because an SE volume may be best suited to performing read operations. If the parameters are defined to optimize workload performance and the read-to-write ratio is low, for example, the target volume 124 may be determined to be a regular volume because a regular volume may be best suited to performing write operations.

Once the characteristics of the target volume 124 are determined, the storage controller 110 determines whether a volume with the desired characteristics is available in the storage system 100 (P340). If such a volume is available, the volume is selected as the target volume 124 (P380).

In some embodiments, if a plurality of volumes are identified that match the desired characteristics, additional volume attributes or characteristics may be considered to select the more suitable volume from among said plurality of volumes. Alternatively, if no volume is identified that satisfies all the desired characteristics, the most suitable volume that matches the highest number of the desired characteristics may be selected as the target volume.

In certain embodiments, if a suitable volume is not identified, the storage controller 110 determines whether it is possible to modify an available volume to have the characteristics (P350). If such a volume is available, the volume is modified (P360) and selected as the target volume 124 (P380). For example, if the target volume 124 is determined to be at least of a certain size, the storage controller 110 may resize a repository volume to the desired size and select the repository volume as storage pool for the target volume 124.

If there is no available volume that has or can be modified to have the characteristics, the storage controller 110, where possible, creates a volume with the characteristics (P370) and selects the volume as the target volume 124 (P380). Accordingly, the target volume 124 may be thus selected from a pre-configured available volume, a dynamically configured available volume, or a newly created volume in the storage system 100, as provided above (P380).

Advantageously, the above systems and methods may be implemented in accordance with one or more embodiments to use dynamic information to automatically select a target volume that is configured to best suit a particular backup request. In different embodiments, the invention may be implemented either entirely in the form of hardware or entirely in the form of software, or a combination of both hardware and software elements.

For example, storage system 100 may be included in a controlled computing system environment that can be presented largely in terms of hardware components and software code executed to perform processes that achieve the results contemplated by the system of the present invention.

Figure 4:
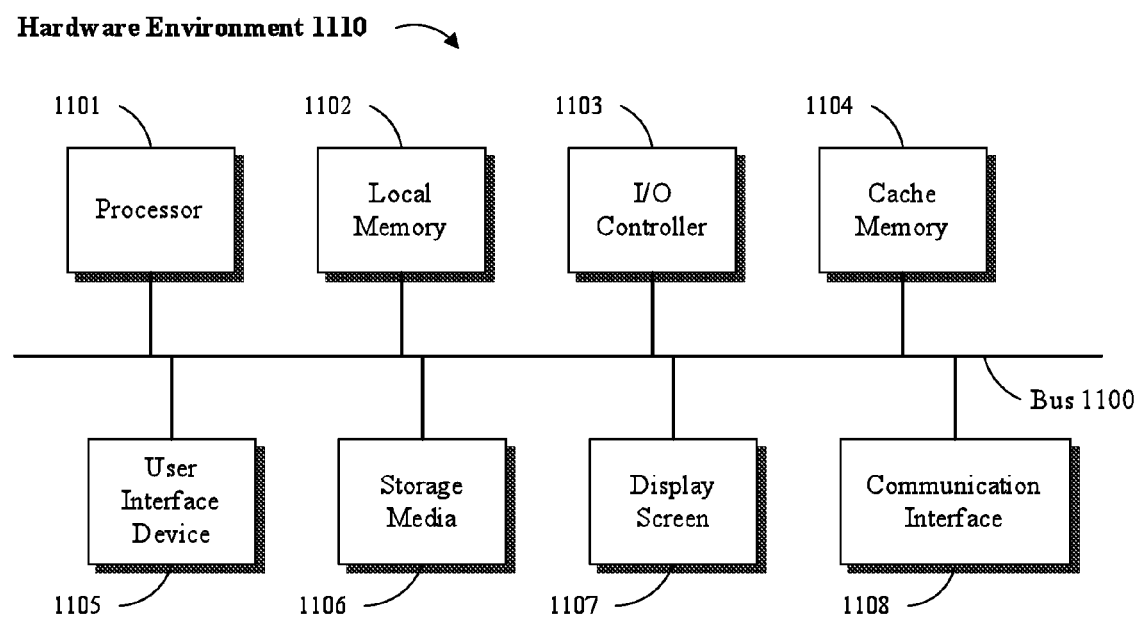
FIGS. 4 and 5 are block diagrams of hardware and software environments in which a system of the present invention may operate, in accordance with one or more embodiments.
Figure 5:
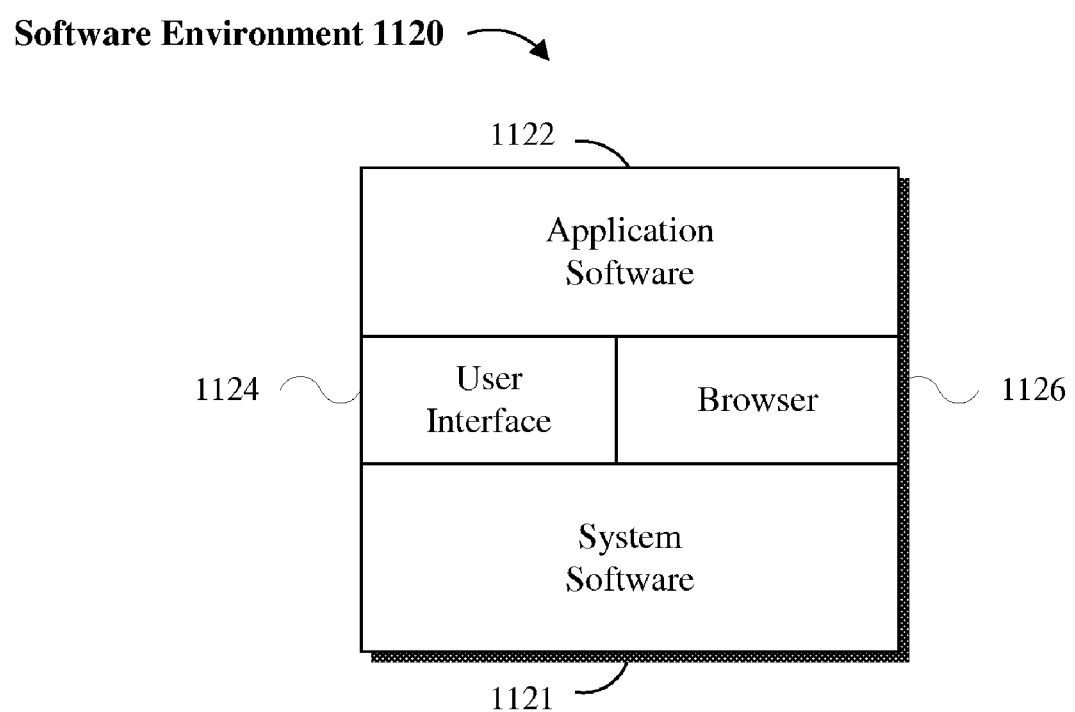

Referring to FIGS. 4 and 5, a computing system environment in accordance with an exemplary embodiment is composed of a hardware environment 1110 and a software environment 1120. The hardware environment 1110 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. System software 1121 comprises control programs, such as the operating system (OS) and information management systems that instruct the hardware how to function and process information.

In one embodiment, storage controller 110 is implemented as application software 1122 executed on one or more hardware environments to create target volumes based on user preferences. Application software 1122 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 4, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106 (i.e., storage devices 120), and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on a general computing system (not shown) and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

The present invention has been described above with reference to one or more features or embodiments. Those skilled in the art will recognize, however, that changes and modifications may be made to these embodiments without departing from the scope of the present invention. These and various other adaptations and combinations of the embodiments disclosed are within the scope of the invention and are further defined by the claims and their full scope of equivalents.

What is claimed is:

1. A data backup method in a storage system, the method comprising:
    defining one or more parameters for a plurality of storage volumes in the storage system such that values of said parameters are used to determine how to best choose a backup target volume for at least one of said plurality of storage volumes, such that the target volume meets one or more objectives that satisfy user preferences for backing up the data stored on the at least one of said plurality of storage volumes;
    dynamically collecting information related to the parameters while the storage volumes are used, wherein said information is collected prior to receiving a backup request;
    receiving a request to backup a first source volume in the storage system; and
    selecting or creating the target volume based on the collected information, wherein the target volume meets the one or more objectives that satisfy the user preference in an optimum manner, and
    wherein the one or more objectives are not exclusively related to maximizing speed of the requested backup process, and depending on priority assigned to said one or more objectives the target volume is selected to satisfy a maximum number of the user preferences,
    wherein the target volume is provisioned as a space efficient (SE) volume, in response to determining that read-to-write ratio for the at least one of said plurality of storage volumes is higher than a threshold.

2. The method of claim 1, wherein the parameters are defined to optimize workload performance.

3. The method of claim 2, wherein the collected information includes at least one of input/output (I/O) rate and read-to-write ratio.

4. The method of claim 1, wherein the parameters are defined to optimize space usage.

5. The method of claim 4, wherein the collected information includes at least one of space currently allocated, capacity, allocation rate, maximum space usage, or recent use patterns.

6. The method of claim 1, wherein the parameters are defined to optimize power consumption.

7. The method of claim 1, wherein the parameters are defined according to default settings.

8. The method of claim 1, wherein the target volume is a regular volume.

9. The method of claim 1, wherein the target volume is a space efficient (SE) volume.

10. The method of claim 1, wherein the target volume is pre-configured.

11. The method of claim 1, wherein the target volume is dynamically configured.

12. The method of claim 11, wherein the target volume is dynamically resized.

13. A data backup method in a storage system, the method comprising:

- defining one or more parameters for a plurality of storage volumes in the storage system such that values of said parameters are used to determine how to best choose a backup target volume for at least one of said plurality of storage volumes, such that the target volume meets one or more objectives that satisfy user preferences for backing up the data stored on the at least one of said plurality of storage volumes;
- dynamically collecting information related to the parameters while the storage volumes are used, wherein said information is collected prior to receiving a backup request;
- receiving a request to backup a first source volume in the storage system;
- determining based on the collected information a target volume that is best suited for the backup request by:
- selecting a first volume that meets the one or more objectives that satisfy the user preferences;
- selecting a second volume that is modifiable to meet the one or more objectives that satisfy the user preferences and modifying the second volume accordingly, in response to determining that the first volume does not exist; and
- creating a third volume that meets the one or more objectives that satisfy the user preferences, in response to determining that the first and second volumes do not exist,
- wherein the one or more objectives are not exclusively related to maximizing speed of the requested backup process, and depending on priority assigned to said one or more objectives the target volume may be selected such that speed of the requested backup process is reduced in favor of satisfying a maximum number of the user preferences,
- wherein the target volume is provisioned as a space efficient (SE) volume, in response to determining that read-to-write ratio for the at least one of said plurality of storage volumes is higher than a threshold.

14. A data backup system comprising:

- one or more processor in communication with a plurality of storage volumes to backup data from one volume to another volume in a storage system;
- wherein one or more parameters for the plurality of storage volumes in the storage system are defined such that values of said parameters are used to determine a backup target volume for at least one of the plurality of storage volumes such that the target volume best meets one or more objectives that satisfy user preferences for backing up the data stored on the at least one of said plurality of storage volumes;
- wherein information related to the parameters are dynamically collected while the storage volumes are used, wherein said information is collected prior to receiving a backup request; on
- wherein a request to backup a first source volume in the storage system is received; and
- wherein the target volume is selected or created based on the collected information, wherein the target volume meets the one or more objectives that satisfy the user preference in an optimum manner, and
- wherein the one or more objectives are not exclusively related to maximizing speed of the requested backup process, and depending on priority assigned to said one or more objectives the target volume may be selected such that speed of the requested backup process is reduced in favor of satisfying a maximum number of the user preferences,
- wherein the target volume is provisioned as a space efficient (SE) volume, in response to determining that read-to-write ratio for the at least one of said plurality of storage volumes is higher than a threshold.

15. The system of claim 14, wherein the parameters are defined to optimize at least one of workload performance, space usage, or power consumption.

16. The system of claim 14, wherein the parameters are defined according to default settings.

17. The system of claim 14, the target volume is a regular volume.

18. The system of claim 14, the target volume is a space efficient (SE) volume.

19. The system of claim 14, the target volume is pre-configured.

20. The system of claim 14, wherein the target volume is dynamically configured.

* * * * *